(12) United States Patent
Ham et al.

(10) Patent No.: US 10,775,144 B2
(45) Date of Patent: Sep. 15, 2020

(54) LENGTH MEASURING DEVICE

(71) Applicant: BAGEL LABS CO., LTD., Seongnam-si, Gyeonggi-do (KR)

(72) Inventors: Sung Seek Ham, Seoul (KR); Jung Hoon Hwang, Bucheon-si (KR); Myung Jong Kim, Seoul (KR); Min Ki Son, Bucheon-si (KR)

(73) Assignee: BAGEL LABS CO., LTD., Seongnam-si, Gyeonggi-Do (KR)

( * ) Notice: Subject to any disclaimer, the term of this patent is extended or adjusted under 35 U.S.C. 154(b) by 248 days.

(21) Appl. No.: 16/101,683

(22) Filed: Aug. 13, 2018

(65) Prior Publication Data
US 2019/0310064 A1 Oct. 10, 2019

(30) Foreign Application Priority Data
Apr. 6, 2018 (KR) .................. 10-2018-0040636

(51) Int. Cl.
*G01B 3/1005* (2020.01)
*G01B 3/1041* (2020.01)
*G01B 3/102* (2020.01)
*G01B 3/1069* (2020.01)

(52) U.S. Cl.
CPC ......... *G01B 3/1005* (2013.01); *G01B 3/1041* (2013.01); *G01B 3/102* (2020.01); *G01B 3/1069* (2020.01); *G01B 2003/1035* (2013.01)

(58) Field of Classification Search
CPC ............ G01B 3/1069; G01B 3/1056; G01B 2003/1023; G01B 3/1041; G01B 3/1043; G01B 3/1061; G01B 3/1003; G01B 3/1005; G01B 3/1084; G01B 2003/1053; G01B 2210/60; G01B 3/12; G01B 7/026; G01B 2003/1035; G01B 3/102; G01B 3/1046; G01B 3/1094
USPC ............................................. 33/767
See application file for complete search history.

(56) References Cited

U.S. PATENT DOCUMENTS

| | | | | |
|---|---|---|---|---|
| 5,718,056 A * | 2/1998 | Miyasaka | ........... | G01B 3/1005 33/761 |
| 6,550,155 B1 * | 4/2003 | Hsu | ...................... | G01B 3/1005 242/395 |
| 9,874,428 B1 * | 1/2018 | Nelson | ................. | H05K 999/99 |
| D853,868 S * | 7/2019 | Park | .............................. | D10/72 |
| 10,393,490 B2 * | 8/2019 | Park | ........................ | G01B 3/10 |
| D864,769 S * | 10/2019 | Park | .............................. | D10/72 |
| 2003/0131491 A1 * | 7/2003 | Weeks | ................. | G01B 3/1061 33/762 |
| 2017/0082413 A1 * | 3/2017 | Park | ........................ | G01B 3/10 |
| 2018/0273341 A1 * | 9/2018 | Vitas | .................... | G01B 3/1041 |
| 2018/0334354 A1 * | 11/2018 | Orsini | ................. | B65H 75/486 |
| 2019/0011244 A1 * | 1/2019 | Orsini | ................. | G01B 3/1005 |
| 2019/0310064 A1 * | 10/2019 | Ham | .................... | G01B 3/1041 |
| 2019/0310065 A1 * | 10/2019 | Hwang | ................ | G01B 3/1041 |

\* cited by examiner

*Primary Examiner* — Yaritza Guadalupe-McCall
(74) *Attorney, Agent, or Firm* — Rabin & Berdo, P.C.

(57) ABSTRACT

Provided is a length measuring device, which includes a first case including a bobbin axis at a center, a second case to which a circuit board is attached, a bobbin mounted on the bobbin axis and around which a tape is wound, a sensor for sensing an amount of rotation of the bobbin rotated by the tape being pull-out, and first and second anti-tilt members for preventing tilting of the bobbin during rotation of the bobbin.

9 Claims, 7 Drawing Sheets

LENGTH MEASURING DEVICE

CROSS-REFERENCE TO RELATED APPLICATIONS

This application claims priority from Korean Patent Application No. 10-2018-0040636, filed on Apr. 6, 2018 in the Korean Intellectual Property Office, the disclosure of which is incorporated herein by reference in its entirety.

BACKGROUND

Technical Field

The present disclosure relates to a length measuring device, and more particularly, to a length measuring device with an improved accuracy of rotation of a bobbin by an addition of means for supporting from above and below the axis of rotation of the bobbin on which a tape as a length measuring means is wound.

Description of the Related Art

In general, a measuring tape is made in a tape form and provided with graduations indicative of length marked on a surface thereof so that it is used to measure a width or an area of a certain space, or to measure a size, a length, or a width of the object to be measured. While there are several types of measuring tapes, a typical measuring tape includes a ruler wound in the form of a coil and is marked with graduations on the surface thereof, and a case having an inner space for accommodating the ruler and an entrance for guiding pull-in an pull-out of the ruler stored in the inner space. In order to measure the length of the measurement object, a user of the measuring tape can pull out the ruler marked with the graduation and read the graduation on one end and a body portion of the ruler when the ruler reaches an end of the subject being measured.

Recently, instead of directly reading the graduation marked on the measuring tape, an electronic length measuring device has been developed, which electronically measures the length of a tape being pulled out and indicates the result as a numerical value. Such an electronic length measuring device measures the pull-out length of the tape by sensing the number of rotations of the bobbin wound with the measuring tape and calculating the pull-out length based on the sensed result.

However, in such a conventional electronic length measuring device, there is a problem that an error occurs in measurement because the axis of rotation of the bobbin on which the measuring tape is wound is not appropriately constrained, in which case the axis of the measuring tape can be tilted or the density of the measuring tape stacked on the bobbin cannot be maintained constant.

That is, if there is a large clearance on the axis of rotation of the bobbin, the accuracy of measurement will be affected. Accordingly, it is necessary to control the clearance of the axis of rotation, but the conventional electronic length measuring device has a problem that measurement errors are caused because the rotating axis of the bobbin is confined at only one side.

SUMMARY

It is an object of the present disclosure to provide an electronic length measuring device that improves accuracy of measurement by appropriately constraining the axis of rotation of a bobbin of the electronic length measuring device, on which the measuring tape is wound.

According to an embodiment of the present disclosure, a length measuring device is provided, which may include a first case 110 including a bobbin axis 111 at a center, a second case 120 to which a circuit board 125 is attached, a bobbin 350 mounted on the bobbin axis 111 and around which a tape is wound, a sensor for sensing an amount of rotation of the bobbin rotated by the tape being pull-out, and first and second anti-tilt members 150 and 160 for preventing tilting of the bobbin during rotation of the bobbin, in which the first anti-tilt member 150 may include a first horizontal fixing part 151 coupled to the circuit board and a first vertical fixing part 153 formed in a cylindrical shape vertically to the first horizontal fixing part 151, and the second anti-tilt member 160 may include a second horizontal fixing part 161 to rotate together with the bobbin, with an inner circumferential surface 165 of the second anti-tilt member 160 being rotatably coupled to an upper end of the bobbin axis 111 and an outer circumferential surface 162 of the second anti-tilt member 160 being coupled to an inner circumferential surface of the inner cylinder 353 of the bobbin around which the tape is wound, and a second vertical fixing part 163 formed in a cylindrical shape vertically to the second horizontal fixing part, such that the lower end of the first vertical fixing part 153 is in contact with the upper surface of the second horizontal fixing part 161, thereby preventing tilting motion of the rotating bobbin.

According to the present disclosure, the configuration of the present disclosure described above provides an advantageous effect of improved accuracy of length measurement, by appropriately constraining the axis of rotation of the bobbin of the electronic length measuring device from above and below the bobbin and thus preventing tilting motion of the bobbin during rotation.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

The objectives, specific advantages and novel features of the present disclosure will become more apparent from the following detailed description and the preferred embodiments, which are associated with the accompanying drawings. Also, terms are used herein in consideration of functions in the present disclosure, which may vary depending on the intentions or practice of user/operator. Therefore, the definition of these terms should be based on the entire contents of the description.

Figure 1:
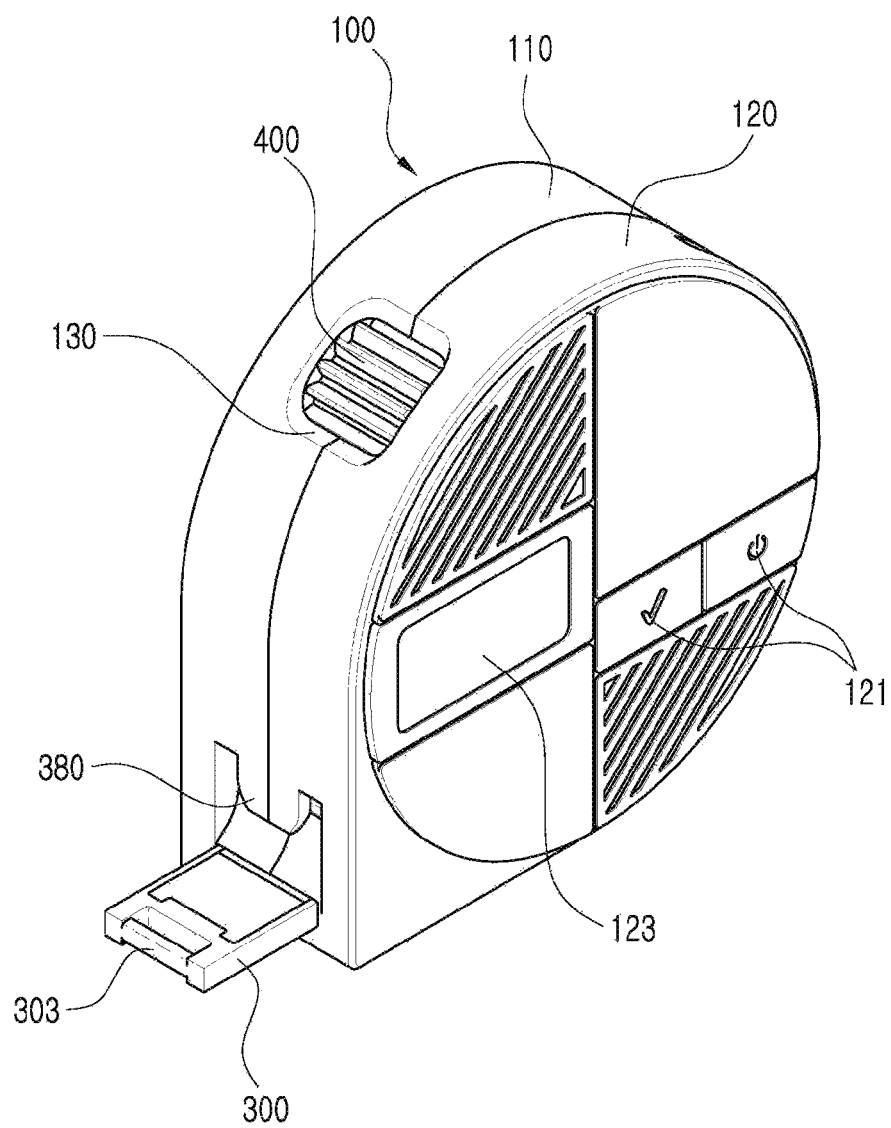
FIG. 1 is a schematic perspective view of a length measuring device according to an embodiment of the present disclosure.
Figure 2:
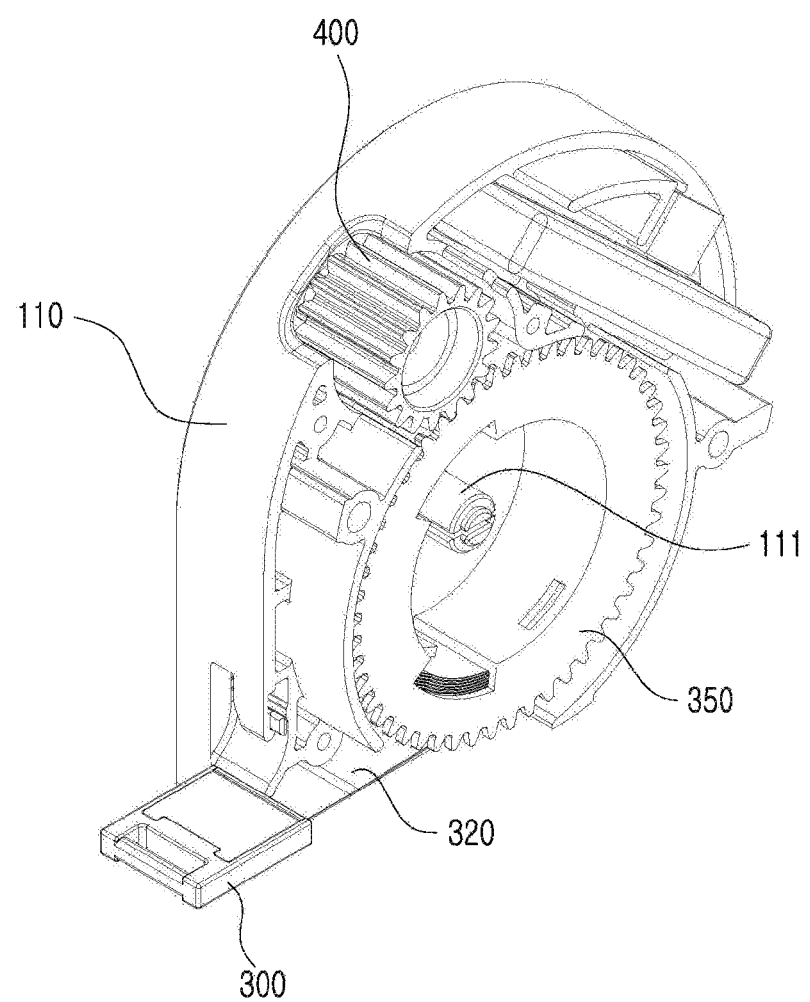
FIGS. 2 and 3 are exploded perspective views of a case of a length measuring device according to an embodiment of the present disclosure.
Figure 3:
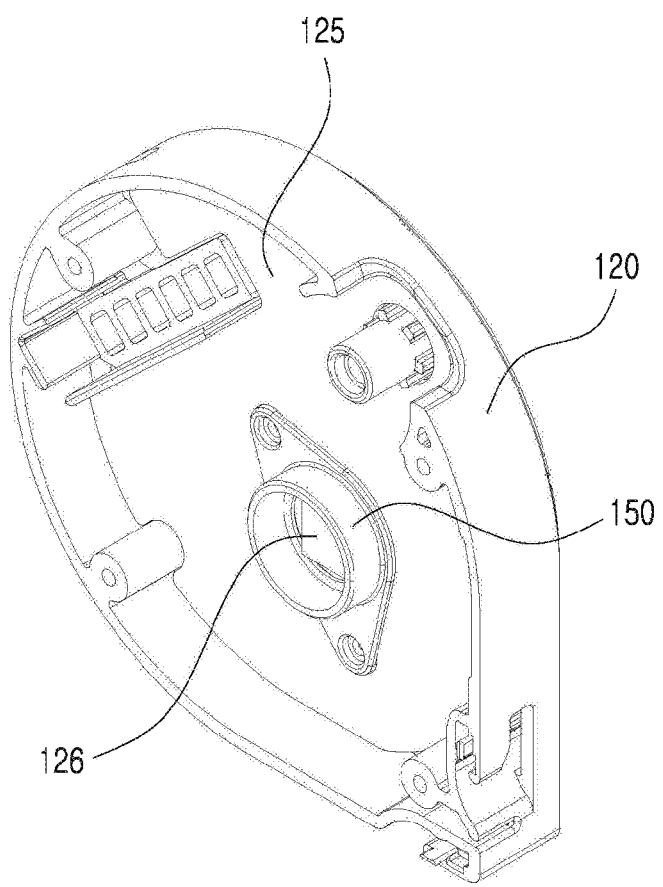
Figure 4:
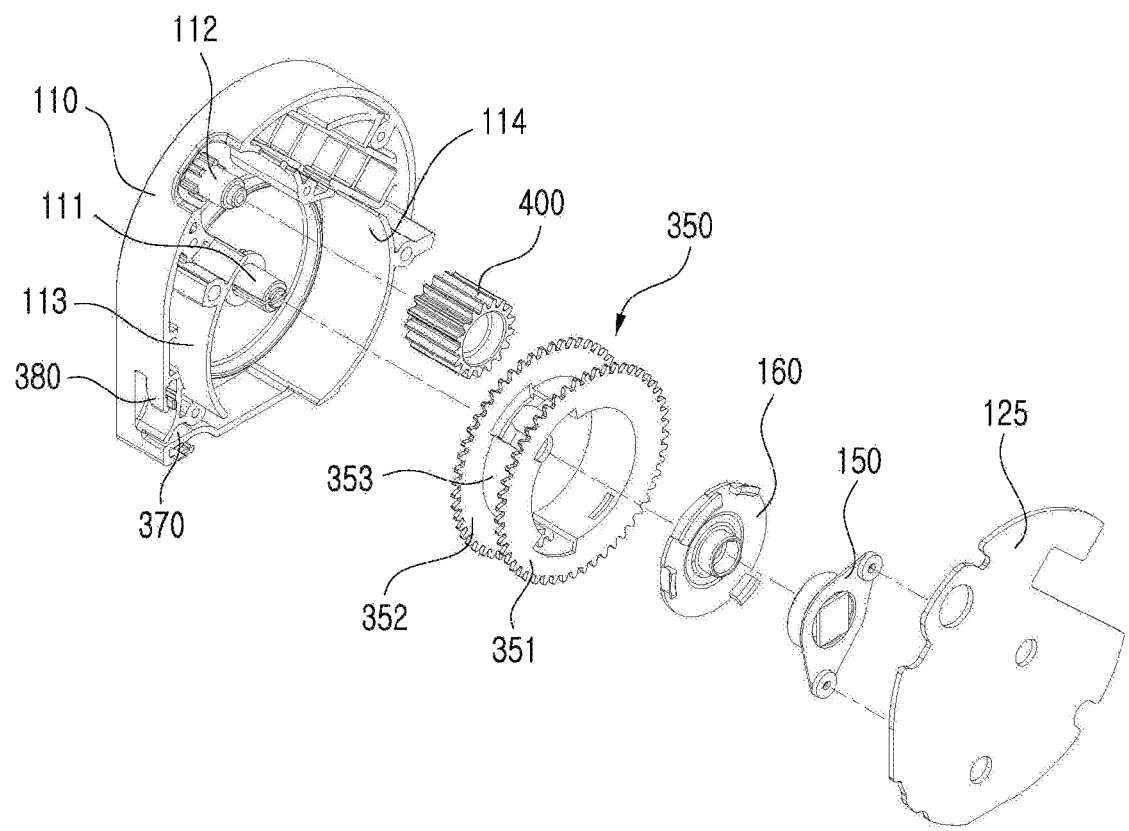
FIG. 4 is an exploded perspective view showing an inner configuration of a length measuring device according to an embodiment of the present disclosure.

FIG. 1 is a schematic perspective view of a length measuring device according to an embodiment of the present disclosure, FIGS. 2 and 3 are exploded perspective views of a case of a length measuring device according to an embodiment of the present disclosure, and FIG. 4 is an exploded perspective view showing an inner configuration of a length measuring device according to an embodiment of the present disclosure.

The electronic length measuring device (hereinafter, simply referred to as "length measuring device") of the present disclosure measures a length of a to-be-measured portion based on the measuring tape (hereinafter, simply referred to as "tape") pulled out of the case 100 by calculating an extent by which the measuring tape is pulled out of the case 100. Specifically, it is a tool that can sense an amount of rotation of a rotator and calculate the length of the to-be-measured portion by calculating, based on the sensed amount of rotation, the extent by which the tape is pulled out.

Referring to FIG. 1, the length measuring device 100 according to the present disclosure has a configuration in which a first case 110 and a second case 120 are coupled to each other, while containing therein components for measuring a length. On the surface of the second case 120, there are provided an operating button 121 such as a power button for operating the device, and a display unit 123 for displaying necessary information such as a measured length, and so on. On one side of the case 100, there is provided a passage through which the inner tape is pulled outside, and a tape tip 300, to which an end of a tape is attached, is positioned in the passage, and the tape tip 300 is in contact with the case due to an inward elastic force acting on the tape.

Referring to FIGS. 2 to 4, a bobbin axis 111 and a gear axis 112, which are two inwardly projecting axes, are provided inside the first case 110. The bobbin axis 111 is a center axis on which a bobbin 350 is mounted to be mounted inside the case, and the gear axis 112 is a center axis on which an operating gear 400 to be described below is mounted. The bobbin 350 includes a first disk 351 and a second disk 352 each in the form of a thin disk, and an inner cylinder 353 connecting the first disk 351 and the second disk 352. A first gear is formed on outer circumferential surfaces of the first disk 351 and the second disk 352 in the same shape, and the inner cylinder 353 is a portion on which the tape 320 is wound. When the tape tip 300 is pulled, the bobbin 350 is rotated and the tape 320 wound around the bobbin 350 is pulled outside, allowing length to be measured.

The operating gear 400 is a cylindrical member that is mounted on the gear axis 112 to be rotated, and has a second gear formed on the entire outer circumferential surface along the length direction. the first gear formed on the outer circumferential surfaces of the first disk 351 and the second disk 352 and the second gear of the operating gear are engaged with each other to be rotated. The operating gear 400 is mounted on a gear axis 112 provided inside the case, but may be provided such that a portion of the second gear is exposed to the outside for the user to operate the operating gear with his/her hand. That is, the user may rotate the bobbin to the left and right by rotating the operating gear to the left and right. This can be easily utilized particularly when the user wants to pull the tape more tightly in a state that the tape is already rolled onto the bobbin. For example, in the process of measuring length, when the user rotates the operating gear 400 in a state that the tape tip 300 is fixed at a certain position, the bobbin 350 is rotate in the opposite direction by gears engaged with each other, thereby causing the tape 320 to be in a more taut state.

In the present disclosure, when the circumference of a circle like the waist of a human body is measured, making the tape into a taut state can provide more accurate circumferential measurement values, and in order to do this, the tape tip may be pulled out, wrapped around the waist of a human body, fixed at a specific position, and then the tape may be tightened to a tout state with the tape tip remaining in the fixed state. To this end, the operating gear 400 may be rotated so as to apply a rotational force to the bobbin in a direction opposite to the tape pull-out direction, so that the pulled-out tape can be tightened to a taut state.

The second case 120 of the electronic length measuring device of the present disclosure includes a circuit board 125 that is embedded with the parts for performing the calculation necessary for the length measurement by the operation of the operating button, or the like. The circuit board 125 includes various electronic components for operation of display part, button part, magnetic encoder, and the like, to enable the electronic length measuring device to perform the length measuring operation.

The length measuring device of the present disclosure adopts a method of detecting the change of the magnetic field generated by the rotation of the magnet and detecting the amount of rotation of the bobbin 350 on the basis of the change of the magnetic field, and then measuring a length, and a magnetic encoder 126 is embedded in the circuit board 125 to serve as a sensor to sense the amount of rotation of the magnet. In the present disclosure, the magnet M is rotated together with the bobbin, which will be described below with reference to FIG. 6. FIG. 7 is a view showing coupling of certain configurations of the electronic length measuring device according to an embodiment of the present disclosure.

In FIG. 4, a reference numeral 370 denotes a gap through which the tape is pulled out of the case, 380 denotes a hook that can be hooked with a hook 303 provided on a leading end of the tape tip 300 in a state that the tape is pulled out, and reference numeral 114 denotes a partition that is disposed around the bobbin while surrounding the bobbin 350.

The electronic length measuring device according to the present disclosure has anti-tilt members 150 and 160 to prevent the bobbin 350 from inclining ("tilting") with respect to the axis of rotation of the bobbin while the bobbin 350 is being rotated, and this will be described below with reference to FIGS. 5 and 6.

Figure 5:
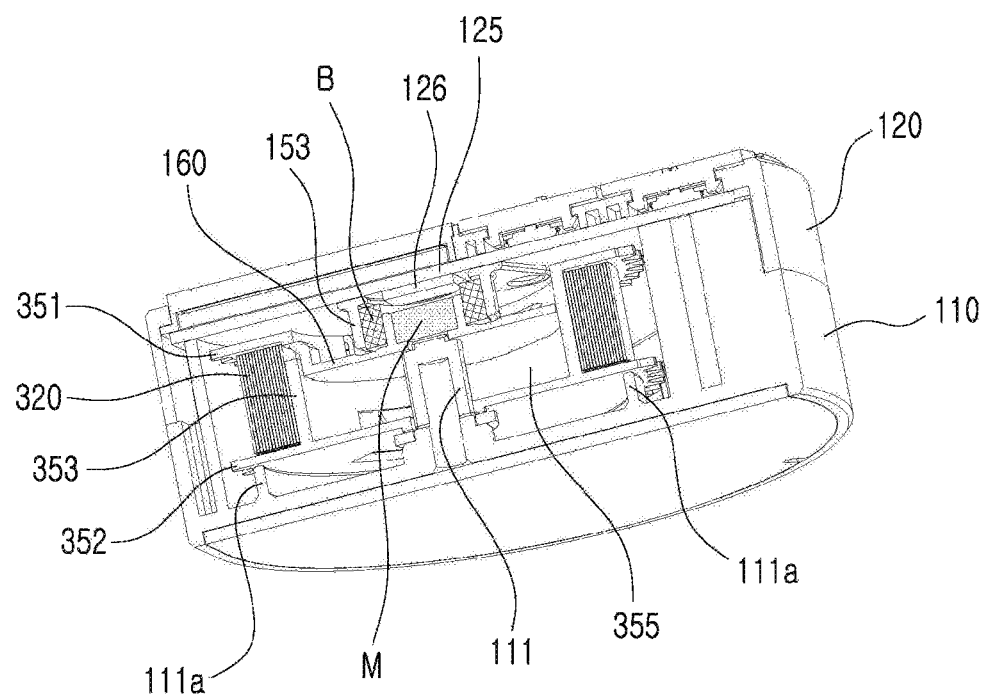
FIG. 5 is an inner cross-sectional view of a length measuring device according to an embodiment of the present disclosure.
Figure 6:
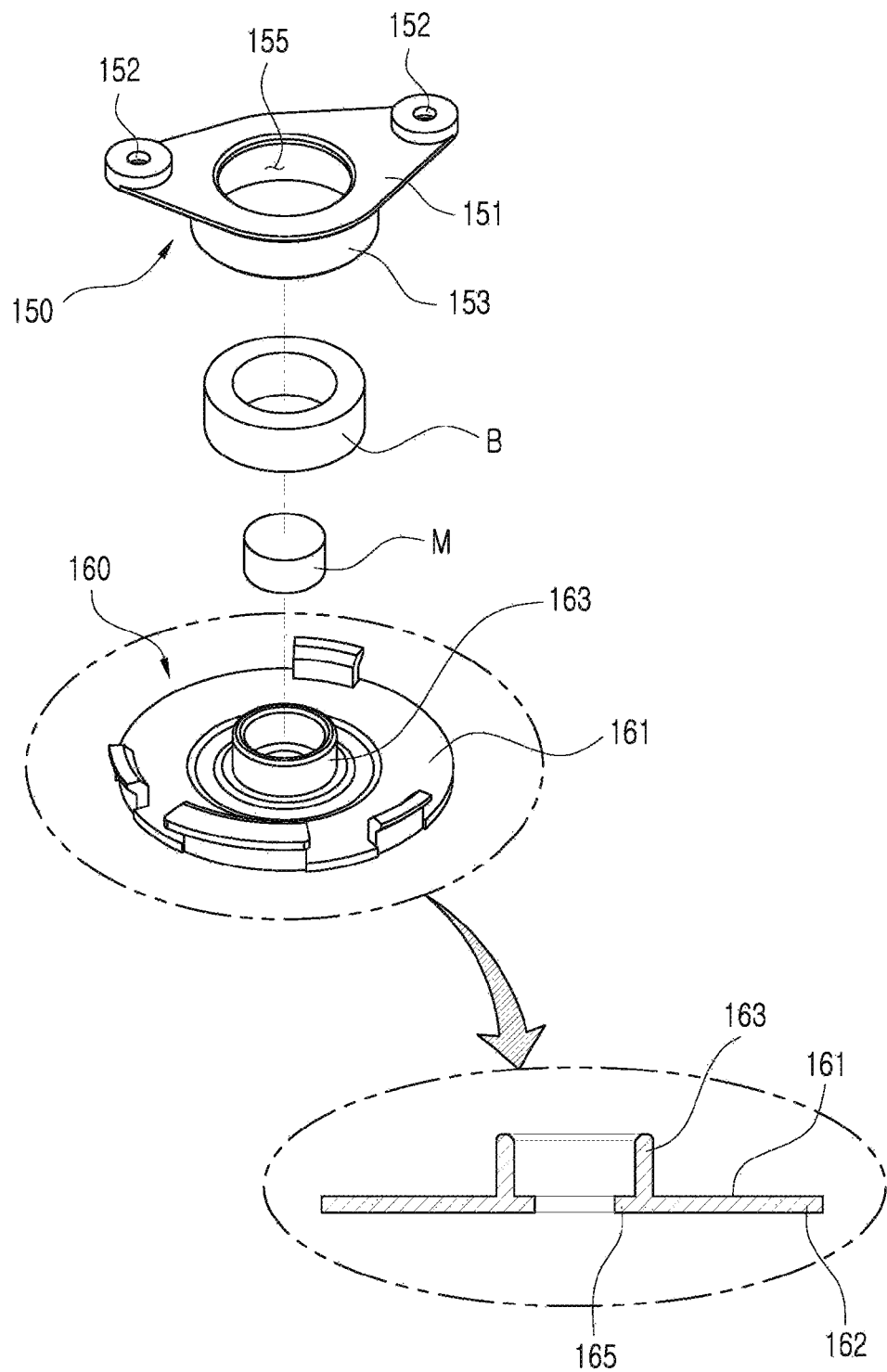
FIG. 6 is a partially enlarged perspective view of a length measuring device according to an embodiment of the present disclosure.
Figure 7:
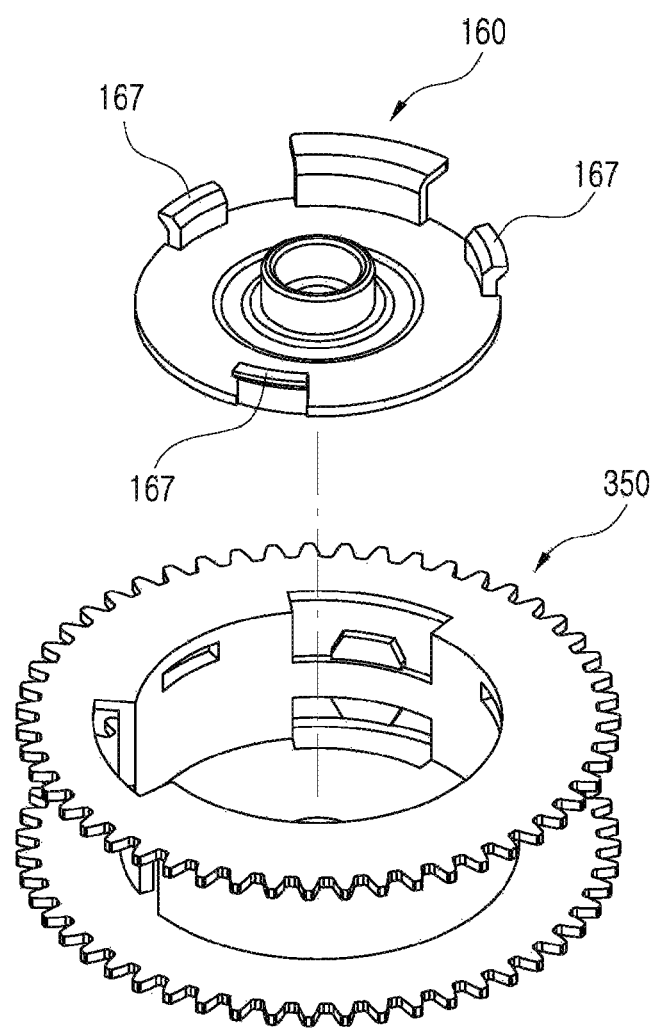
FIG. 7 is a view showing coupling of certain configurations of the length measuring device according to the present disclosure.

FIG. 5 is an inner cross-sectional view of an electronic length measuring device according to an embodiment of the present disclosure, and FIG. 6 is a partially enlarged perspective view of a length measuring device according to an embodiment of the present disclosure.

The bobbin 350 includes a first disk 351 and a second disk 352, being in the form of a thin disk, and an inner cylinder 353 connecting the first disk 351 and the second disk 352 as described above. Specifically, the second disk 352 is in the shape of a disk having a fastening hole formed at a center to be mounted on the bobbin axis 111, and the first disk 351 is formed such that an inner side thereof is extended no further than the inner cylinder 353. Therefore, as shown in FIG. 5, a U-shaped space with an open top is defined by the inner cylinder 353 and the second disk 352, in an upward direction of the second disk and in an inward direction (in an axis direction) of the inner cylinder 353, and this space is referred to herein as a 'bobbin inner space 355' for the sake of convenience.

The electronic length measuring device according to the present disclosure includes the anti-tilting members 150 and 160 to prevent the rotating bobbin 350 from being tilted. The anti-tilt members include a first anti-tilt member 150 fixed to the circuit board 125 and a second anti-tilt member 160 fixed to the bobbin inner space 355.

The first anti-tilt member 150 is an approximately rhombic plate, and includes a first horizontal fixing part 151 coupled to the circuit board 125 by a piece using a coupling hole 152 and a first vertical fixing part 153 formed in a cylindrical shape vertically to the first horizontal fixing part 151.

The second anti-tilt member 160 has a circular plate shape, and includes a second horizontal fixing part 161 coupled to the inner circumferential surface of the inner cylinder 353 in the bobbin inner space 355 and a second vertical fixing part 163 formed in a cylindrical shape vertically to the second horizontal fixing part.

As shown in FIG. 5, the first vertical fixing part 153 is protruded downward from the first horizontal fixing part 151, and the second vertical fixing part 163 is protruded upward from the second horizontal fixing part 161, and a bearing B is provided between the first vertical fixing part 153 and the second vertical fixing part 163 to facilitate the rotation. That is, the outer circumferential surface of the bearing is in contact with the first vertical fixing part 153 and the inner circumferential surface of the bearing is in contact with the second vertical fixing part 163. The magnet M is coupled with the inner space of the second vertical fixing part 163, and the magnet is rotated together with the second vertical fixing part according to the rotation of the bobbin. The first vertical fixing part 153 is protruded downward from the first horizontal fixing part 151 and the lower end of the first vertical fixing part 153 is in contact with the upper surface of the second horizontal fixing part 161.

The lower end of the first vertical fixing part 153 may be entirely in contact with the upper surface of the second horizontal fixing part 161. However, in some embodiments, several protrusions may be protruded downward from the lower end of the first vertical fixing part 153 in a hemispherical shape, while being spaced apart from each other at predetermined intervals, and these downward protrusions may be in contact with the upper surface of the second horizontal fixing part, thereby preventing tilting motion of the rotating bobbin. With the configuration described above, the friction force due to the rotation can be reduced as compared with the case where the entire lower end of the first vertical fixing part is in contact, which is more advantageous for the rotation of the bobbin.

The second anti-tilt member 160 is rotated together with the bobbin, because the outer circumferential surface 162 of the second horizontal fixing part 161 is brought into contact with the inner cylinder 353 of the bobbin when the second anti-tilt member 160 is coupled. As shown in FIG. 7, the second anti-tilt member 160 includes a coupling protrusion 167 formed thereon, which allows the second anti-tilt member 160 to be integrally coupled within the bobbin 350. In addition, the second anti-tilt member 160 is rotatably engaged, as the inner circumferential surface 165 of the second horizontal fixing part 161 is brought into contact with the upper end of the bobbin shaft 111.

The bobbin 350 of the electronic length measuring device of the present disclosure is configured such that the second disk 352 is rotatably mounted on the lower end of the bobbin axis 111 and the inner circumferential surface 163 of the second horizontal fixing part 161 is rotatably mounted while contacting the upper end of the bobbin shaft 111, which thus allow the bobbin to be rotatably mounted on the upper and lower sides of the bobbin side.

In addition, preventing the bobbin from being tilted during rotation increases the accuracy of rotation and increases the accuracy of measurement. In order to prevent the tilting, a bearing B is provided between the first vertical fixing part 153 and the second vertical fixing part 163 for precise and smooth rotation, and the lower end of the first vertical fixing part 153 is in contact with the upper surface of the second horizontal fixing part 161. Thus, the first and second anti-tilt members with first and second vertical fixing parts prevent the tilting motion of the bobbin during rotation of the bobbin.

In addition, according to the present disclosure, a circular support 111a is formed in a circular shape vertically upward from the inside of the first case 110 and is in contact with the lower end of the second disk 353 of the bobbin 350. The circular support 111a also supports the lower end of the rotating bobbin, thereby preventing the tilting motion.

The magnet M coupled with the inner space of the second vertical fixing part 163 may be a permanent magnet of a cylindrical shape and the magnet M may be magnetized in one direction perpendicular to the axis of rotation. The magnetic encoder 126, which is a sensor for sensing the amount of rotation of the magnet, may detect the change in the magnetic field generated by the rotation of the magnet when the bobbin 350 is rotated in accordance with the tape 320 being pulled in or out and calculate the amount of rotation of the bobbin. The magnetic encoder is mounted on the circuit board so as to sense a magnetic force emitted from the magnet, and is mounted on the magnet, or more specifically, is disposed in the inner space of the first vertical fixing part 153. When the amount of rotation of the magnet is sensed, the amount of rotation of the bobbin can be known, and as a result, the length of the pulled-out tape can be calculated so that the length of the subject being measured can be calculated.

What is claimed is:
1. A length measuring device, comprising:
a first case including a bobbin axis at a center;
a second case to which a circuit board is attached;
a bobbin mounted on the bobbin axis and around which a tape is wound;
a sensor for sensing an amount of rotation of the bobbin rotated by the tape being pull-out;
a first anti-tilt member including a first horizontal fixing part coupled to the circuit board and a first vertical fixing part formed in a cylindrical shape vertically to the first horizontal fixing part to prevent tilting of the bobbin during rotation of the bobbin; and
a bearing in contact with an inner circumferential surface of the first vertical fixing part,
thereby preventing a tilting motion of the rotating bobbin.
2. The length measuring device of claim 1, wherein the bobbin includes a first disk and a second disk, being in the form of a disk, and an inner cylinder which connects the first disk and the second disk and around which the tape is wound,
the second disk includes a fastening hole at a center to be mounted on the bobbin axis, and is rotatably mounted on the lower end of the bobbin axis, and
a circular support, protruding in a circular shape vertically upward from inside the first case, is brought into contact with the lower end of the second disk to further prevent tilting motion of the rotating bobbin.

3. A length measuring device, comprising:
a first case including a bobbin axis at a center;
a second case to which a circuit board is attached;
a bobbin mounted on the bobbin axis and around which a tape is wound;
a sensor for sensing an amount of rotation of the bobbin rotated by the tape being pull-out;
a second anti-tilt member including a second horizontal fixing part to rotate together with the bobbin, with an inner circumferential surface of the second anti-tilt member being rotatably coupled to an upper end of the bobbin axis and an outer circumferential surface of the second anti-tilt member being coupled to an inner circumferential surface of the inner cylinder of the bobbin around which the tape is wound, and a second vertical fixing part formed in a cylindrical shape vertically to the second horizontal fixing part, the second vertical fixing part for preventing tilting of the bobbin during rotation of the bobbin; and
a bearing in contact with an inner circumferential surface of the second vertical fixing part,
thereby preventing tilting motion of the rotating bobbin.

4. The length measuring device of claim 3,
wherein the bobbin includes a first disk and a second disk, being in the form of a disk, and an inner cylinder which connects the first disk and the second disk and around which the tape is wound,
the second disk includes a fastening hole at a center to be mounted on the bobbin axis, and is rotatably mounted on the lower end of the bobbin axis, and
a circular support, protruding in a circular shape vertically upward from inside the first case, is brought into contact with the lower end of the second disk to further prevent tilting motion of the rotating bobbin.

5. A length measuring device, comprising:
a first case including a bobbin axis at a center;
a second case to which a circuit board is attached;
a bobbin mounted on the bobbin axis and around which a tape is wound;
a sensor for sensing an amount of rotation of the bobbin rotated by the tape being pull-out; and
first and second anti-tilt members for preventing tilting of the bobbin during rotation of the bobbin,
wherein the first anti-tilt member includes a first horizontal fixing part coupled to the circuit board and a first vertical fixing part formed in a cylindrical shape vertically to the first horizontal fixing part,
and the second anti-tilt member includes,
a second anti-tilt member including a second horizontal fixing part to rotate together with the bobbin, with an inner circumferential surface of the second anti-tilt member being rotatably coupled to an upper end of the bobbin axis and an outer circumferential surface of the second anti-tilt member being coupled to an inner circumferential surface of the inner cylinder of the bobbin around which the tape is wound, and a second vertical fixing part formed in a cylindrical shape vertically to the second horizontal fixing part,
such that the lower end of the first vertical fixing part is in contact with the upper surface of the second horizontal fixing part, thereby preventing tilting motion of the rotating bobbin.

6. The length measuring device of claim 5, further comprising, between the first vertical fixing part and the second vertical fixing part, a bearing, with an outer circumferential surface of the bearing being in contact with the first vertical fixing part and an inner circumferential surface of the bearing being in contact with the second vertical fixing part.

7. The length measuring device of claim 6, comprising, provided on the lower end of the first vertical fixing part, protrusions spaced apart from each other at predetermined intervals and protruding downwards, wherein the protrusions are brought into contact with the upper surface of the second horizontal fixing part, thereby preventing tilting motion of the rotating bobbin.

8. The length measuring device of claim 5, wherein the bobbin includes a first disk and a second disk, being in the form of a disk, and an inner cylinder which connects the first disk and the second disk and around which the tape is wound,
the second disk includes a fastening hole at a center to be mounted on the bobbin axis, and is rotatably mounted on the lower end of the bobbin axis, and
a circular support, protruding in a circular shape vertically upward from inside the first case, is brought into contact with the lower end of the second disk to further prevent tilting motion of the rotating bobbin.

9. The length measuring device of claim 5, further comprising a magnet coupled to an inner space of the second vertical fixing part, wherein the sensor is a magnetic encoder disposed inside the first vertical fixing part and above the magnet and coupled to the circuit board to sense an amount of rotation of the magnet.

* * * * *